US012298677B2

(12) United States Patent
Ma et al.

(10) Patent No.: US 12,298,677 B2
(45) Date of Patent: May 13, 2025

(54) LINKAGE DEVICE AND MOUNTING AND CONVEYING DEVICE FOR TONER SUPPLY CONTAINER

(71) Applicant: BEIJING XINTRON OFFICE EQUIPMENT CO., LTD., Beijing (CN)

(72) Inventors: Xuewen Ma, Beijing (CN); Haifeng Geng, Beijing (CN)

(73) Assignee: BEIJING XINTRON OFFICE EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 18/564,062

(22) PCT Filed: Sep. 22, 2021

(86) PCT No.: PCT/CN2021/119499
§ 371 (c)(1),
(2) Date: Nov. 25, 2023

(87) PCT Pub. No.: WO2022/247072
PCT Pub. Date: Dec. 1, 2022

(65) Prior Publication Data

US 2024/0288790 A1 Aug. 29, 2024

(30) Foreign Application Priority Data

May 26, 2021 (CN) ........................ 202110577374.X

(51) Int. Cl.
*G03G 15/08* (2006.01)
*G03G 15/01* (2006.01)

(52) U.S. Cl.
CPC ... *G03G 15/0105* (2013.01); *G03G 2215/066* (2013.01)

(58) Field of Classification Search
USPC ........................................................... 399/27
See application file for complete search history.

(56) References Cited

U.S. PATENT DOCUMENTS 10,054,904 B1 * 8/2018 Wen .................. G03G 21/1857

FOREIGN PATENT DOCUMENTS

CN 107861349 A * 3/2018 ............ G03G 15/08

OTHER PUBLICATIONS

Computer Translation CN107861349A to Wen et al. (Year: 2018).*

* cited by examiner

*Primary Examiner* — Quana Grainger

(57) ABSTRACT

A linkage device for a toner supply container includes: a transverse linkage, which comprises a rod body and a jaw portion, wherein the jaw portion is connected to a front end of the rod body; and a longitudinal linkage, wherein a first end of the longitudinal linkage is rotatably coupled to the rod body of the transverse linkage. A mounting and conveying device for the toner supply container includes: the linkage device and a cover body, wherein a first connecting post and a third connecting post are arranged on a side face of the cover body; wherein a second end of the longitudinal linkage is rotatably fixed to the first connecting post, and a spring post is connected to the third connecting post by a tension spring. Such structure is well sealed and simple with less wear on the parts.

7 Claims, 15 Drawing Sheets

LINKAGE DEVICE AND MOUNTING AND CONVEYING DEVICE FOR TONER SUPPLY CONTAINER

BACKGROUND OF THE PRESENT INVENTION

Field of Invention

The present invention relates to installation of toner supply containers, and more particularly to a mounting and conveying device for a toner supply container.

Description of Related Arts

For printers and copiers, the toner supply container is a very important part, and requires frequent replacement of cartridges to accommodate a new one. U.S. Pat. No. 10,209,667B2 discloses a developer supplying device, wherein the developer supplying device is engaged by the combination of a sliding rail and a sliding shaft (see FIG. 34 of U.S. Pat. No. 10,209,667B2). However, this mechanism has high friction and is prone to wear out the key parts of the copier. It is very difficult to replace the machine parts when they are worn out, which means it is impossible to replace the parts but to replace the whole assembly. The price is too high.

SUMMARY OF THE PRESENT INVENTION

In response to the problem mentioned above, the present invention provides a linkage device for a toner supply container, comprising: a transverse linkage, which comprises a rod body and a jaw portion, wherein the jaw portion is connected to a front end of the rod body; and a longitudinal linkage, wherein a first end of the longitudinal linkage is rotatably coupled to the rod body of the transverse linkage.

Preferably, a first end of the rod body of the transverse linkage has a first transverse linkage aperture, and the first end of the longitudinal linkage has a first longitudinal linkage aperture; the first transverse linkage aperture is coaxially coupled with the first longitudinal linkage aperture.

Preferably, a spring post for connecting an external tension spring is provided in a middle of the longitudinal linkage, and a prop portion is arranged on a side face of the jaw portion of the transverse linkage.

Preferably, a second end of the rod body of the transverse linkage has a second transverse linkage aperture for connecting an additional longitudinal linkage, a first end of the additional longitudinal linkage is coaxially coupled with the second transverse linkage aperture of the transverse linkage.

The present invention further provides a mounting and conveying device for the toner supply container, comprising: a linkage device comprising: a transverse linkage, which comprises a rod body and a jaw portion, wherein the jaw portion is connected to a front end of the rod body; and a longitudinal linkage, wherein a first end of the longitudinal linkage is rotatably coupled to the rod body of the transverse linkage; and a cover body, wherein a first connecting post and a third connecting post are arranged on a side face of the cover body; wherein a second end of the longitudinal linkage is rotatably fixed to the first connecting post, and a spring post is connected to the third connecting post by a tension spring.

Preferably, a first end of the rod body of the transverse linkage has a first transverse linkage aperture, and the first end of the longitudinal linkage has a first longitudinal linkage aperture; the first transverse linkage aperture is coaxially coupled with the first longitudinal linkage aperture.

Preferably, a prop portion is arranged on a side face of the jaw portion of the transverse linkage.

Preferably, the mounting and conveying device further comprises: a base, wherein the base has a base holder; the prop portion is pulled by the tension spring, so as to cooperate with the base holder and back to an initial position.

Preferably, a second connecting post is further arranged on the side face of the cover body.

Preferably, the linkage device further comprises an additional longitudinal linkage; a second end of the rod body of the transverse linkage has a second transverse linkage aperture; a first end of the additional longitudinal linkage is coaxially coupled with the second transverse linkage aperture of the transverse linkage; a second end of the additional longitudinal linkage is coaxially coupled with the second connecting post.

The beneficial effect of the present invention is that a combination of the linkages is used to replace the conventional slide rail, so as to achieve the same effect. A lifting device is required to lift the machine. The present invention converts sliding friction into rotating friction, which provides a smaller resistance to effectively reduce the post wear of the lifting device required by the machine. Toner consumables can be installed repeatedly, and a service life of the lifting device required by the machine is extended.

BRIEF DESCRIPTION OF THE DRAWINGS

In order to further illustrate the present invention, detailed description will be given by reference to the embodiment shown in the accompanying drawings. These drawings depict only preferred embodiment of the present invention and are not intended to be limiting.

Figure 1:
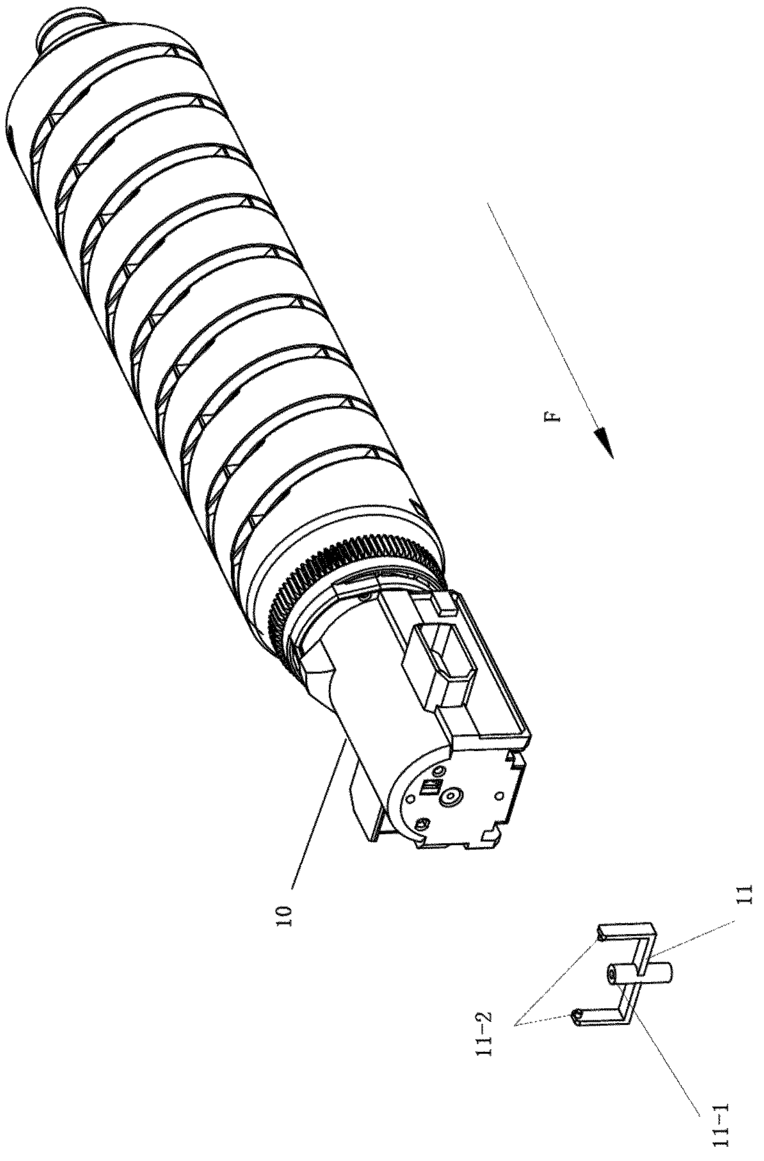
FIG. 1 is an assembly drawing of a toner collecting device and a toner container.

ELEMENT REFERENCE toner container 10, toner outlet 10-1; toner collecting device 11, toner collecting port 11-1, post 11-2; transverse linkage 1, jaw portion 1-1, rod body 1-2, first transverse linkage aperture 1-3, second transverse linkage aperture 1-4, prop portion 1-5; longitudinal linkage 2, first longitudinal linkage aperture 2-1, second longitudinal linkage aperture 2-2, boss 2-3, spring post 2-4, slot 2-5, reinforcement 2-6; linkage device 3; tension spring 4, first hook 4-1, second hook 4-2; piercing peg 5, slot position 5-1; circlip 6; cover body 7, first connecting post 7-1, second connecting post 7-2, third connecting post 7-3; base 8, base holder 8-1, base toner outlet 8-2.

DETAILED DESCRIPTION OF THE PREFERRED EMBODIMENT

The following embodiments of the present invention are described with reference to the accompanying drawings so that those skilled in the art may better understand the present invention and be able to implement it, but are not intended to be limiting. The following embodiments and technical features in the embodiments may be combined with each other in the absence of conflict, wherein the same components are indicated by the same element references.

Figure 2:
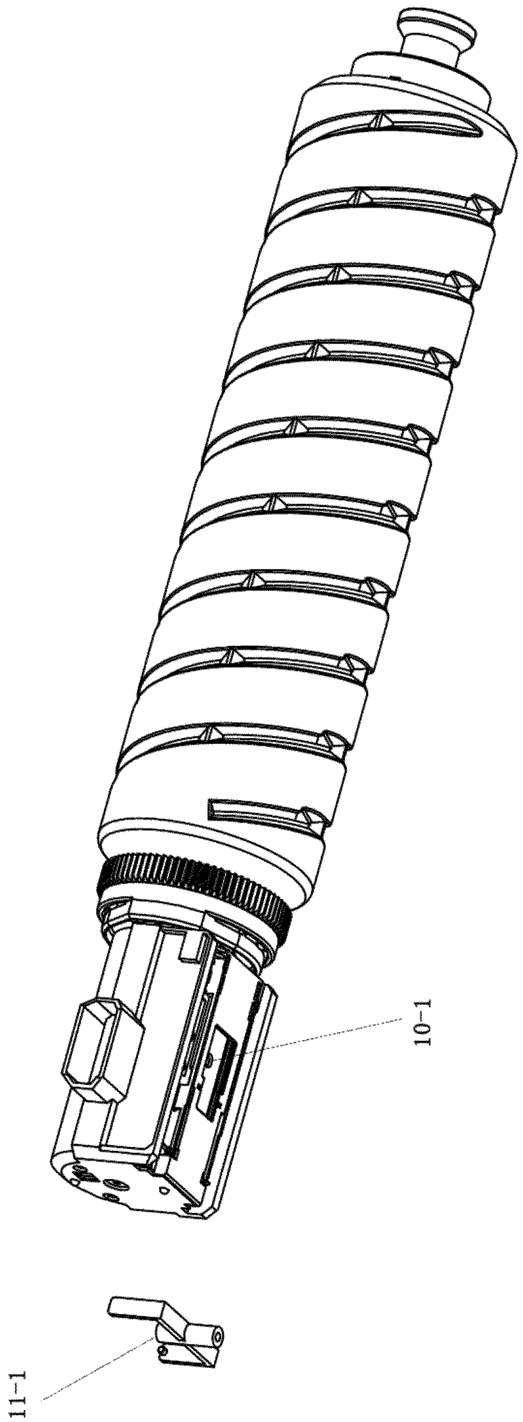
FIG. 2 is another assembly drawing of the toner collecting device and the toner container from a different angle of view.
Figure 3:
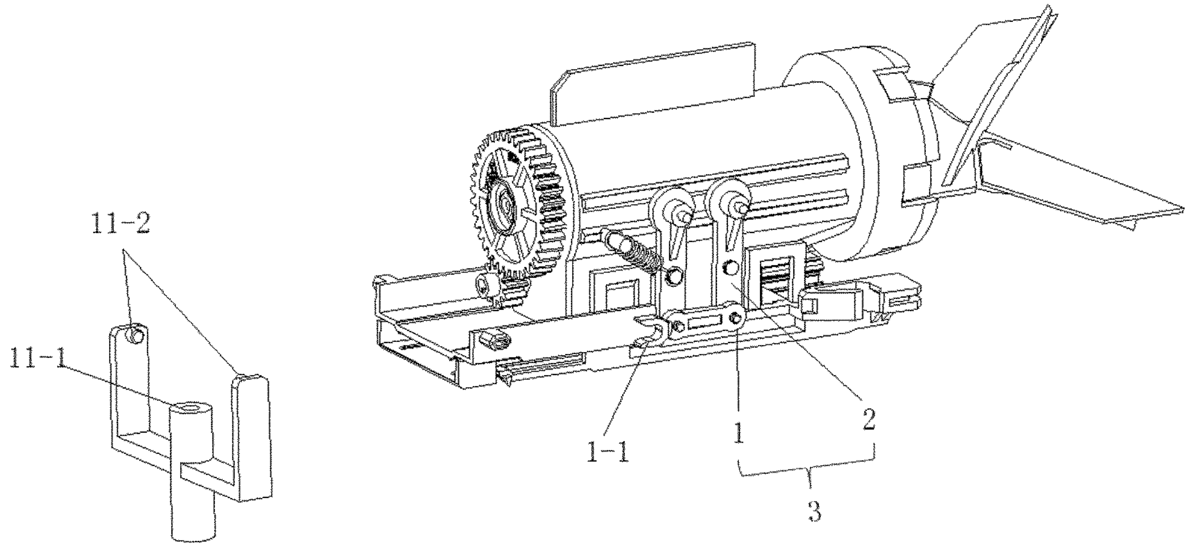
FIG. 3 is a perspective view of the toner container after removing a shell and a cartridge.

Referring to FIGS. 1 and 2, the toner collecting device 11 has posts 11-2 at both ends, and the posts 11-2 are provided with projections on the opposite internal sides for fitting to a jaw portion 1-1 of a transverse linkage 1 (see FIG. 3). A middle of the post 11-2 has a toner collecting port 11-1. After the toner collecting device 11 and a toner container 10 are engaged and docked, the toner collecting port 11-1 of the toner collecting device 11 is aligned with the toner outlet 10-1 of the toner container 10. A docking process is as follows: in a direction of arrow F, inserting the toner container 10 between the two posts 11-2 of the toner collecting device 11, lifting and pulling the two posts 11-2 so that the toner collecting port 11-1 presses against the toner outlet 10-1 of the toner container 10 for docking and sealing, so that toner inside the toner container enters the toner collecting port 11-1 of the toner collecting device 11 through the toner outlet 10-1, thereby supplying the toner.

Figure 4:
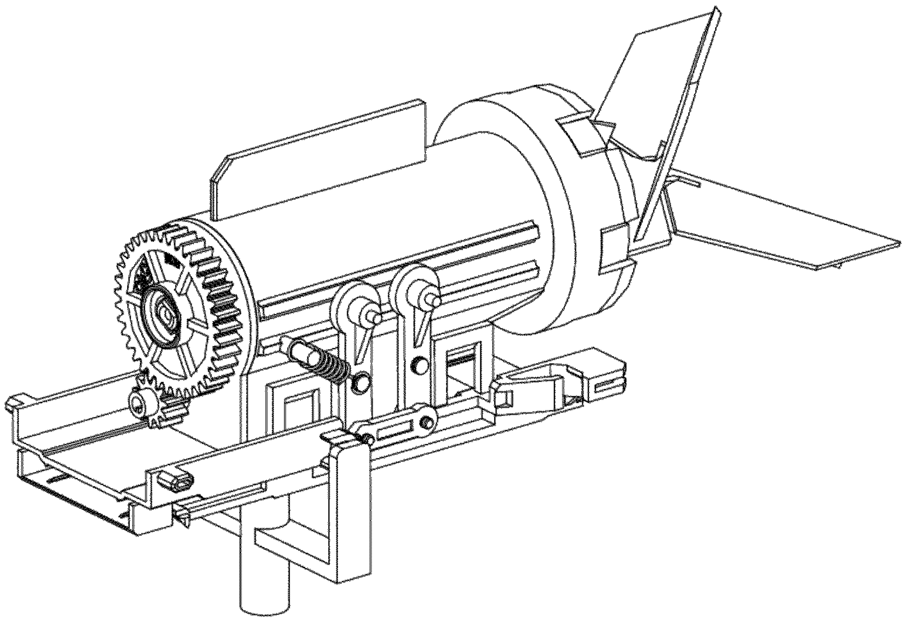
FIG. 4 is a sketch view of the toner container and the toner collecting device at beginning of installation.

FIG. 3 is a perspective view of the toner container after removing a shell and a cartridge. Linkage devices 3 are provided on both sides of the toner container 10. Each linkage device 3 comprises a transverse linkage 1 (see FIG. 10), and a jaw portion 1-1 is provided on a front end of the transverse linkage 1 (in a moving direction of the toner container 10). After the toner container is loaded, the posts 11-2 on the toner collecting device 11 are engaged with the jaw portion 1-1, which is shown in FIG. 4.

Figure 5:
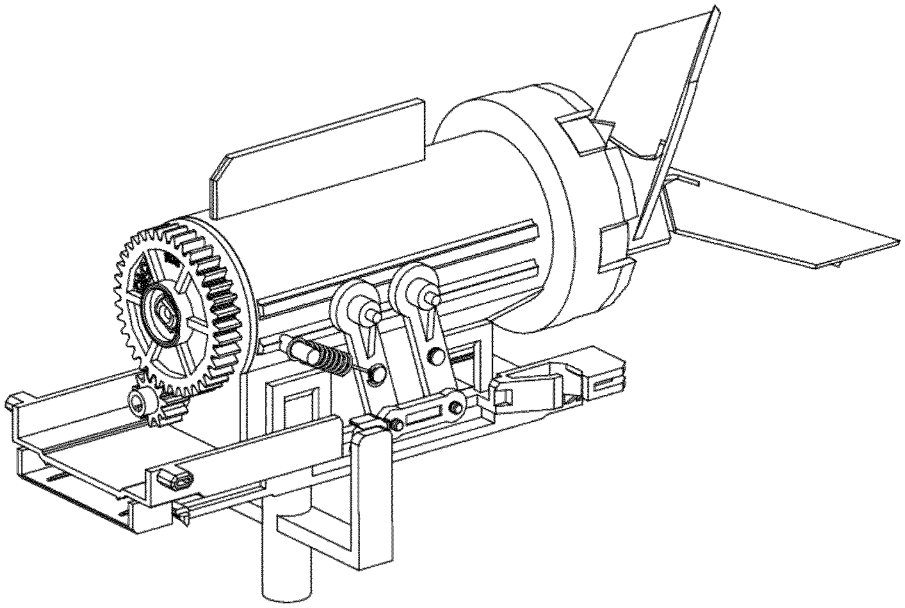
FIG. 5 is a sketch view of the toner container and the toner collecting device during the installation.
Figure 6:
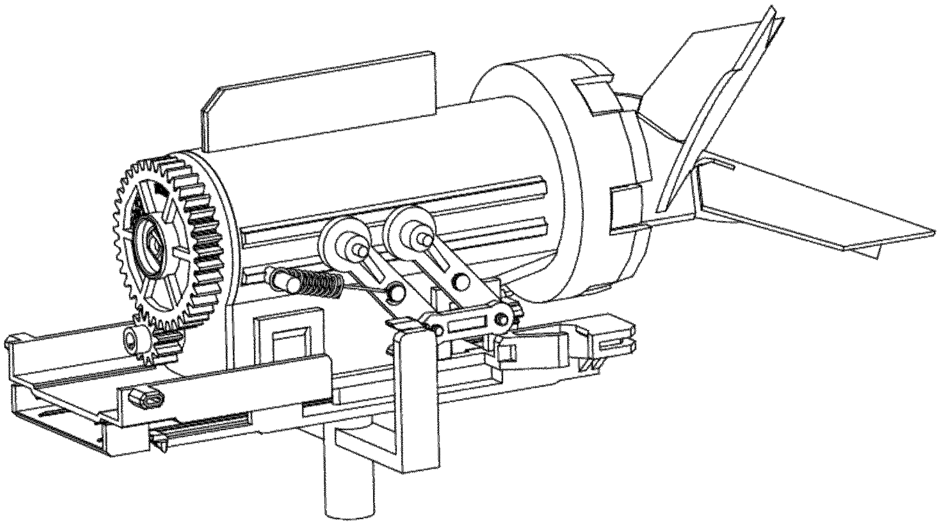
FIG. 6 is a sketch view of the toner container and the toner collecting device after the installation.
Figure 7:
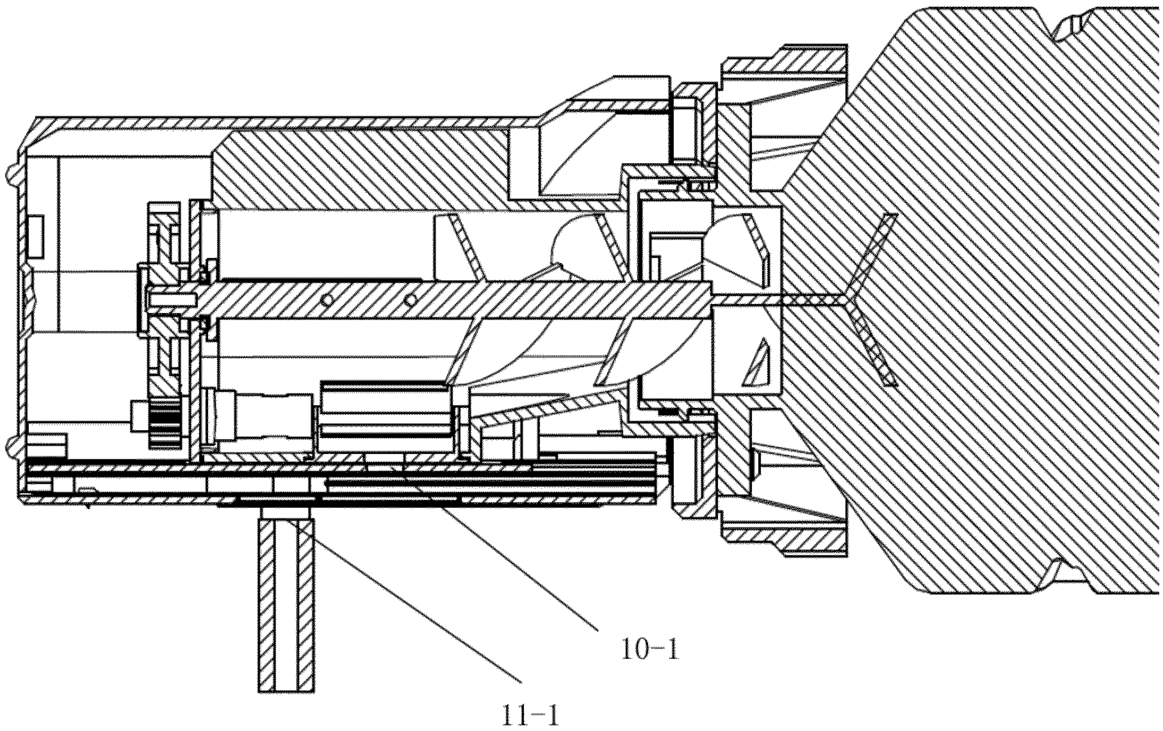
FIG. 7 is a sectional view of the state shown in FIG. 4.
Figure 8:
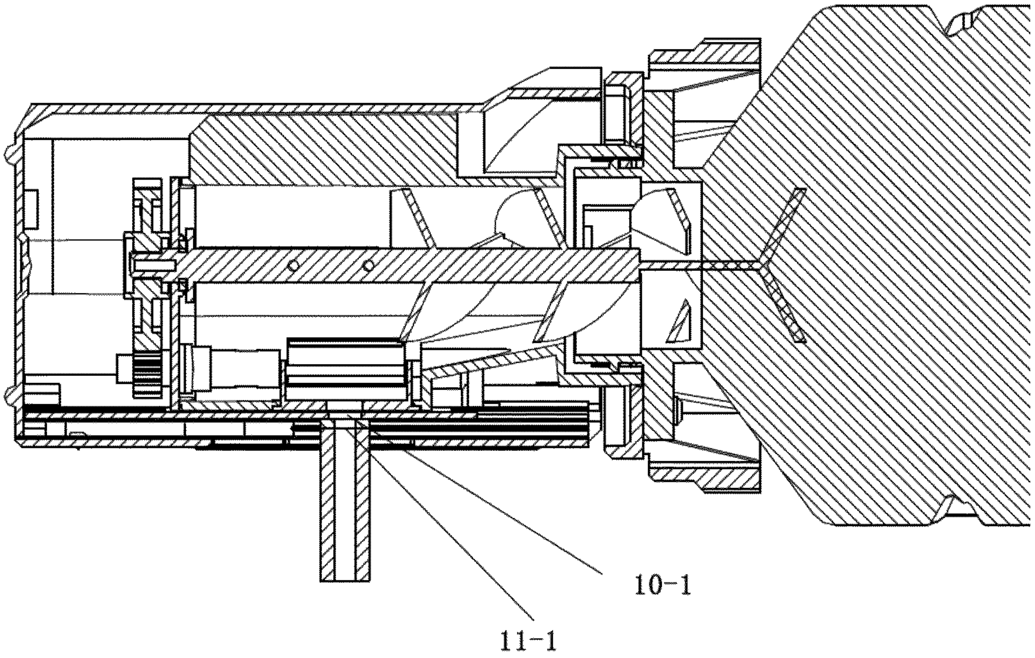
FIG. 8 is a sectional view of the state shown in FIG. 6.

As the toner container 10 continues to be pushed in, the toner collecting device 11 should be lifted, so that the toner outlet 10-1 of the toner container 10 is closely docked to the toner collecting port 11-1 of the toner collecting device 11. As shown in FIG. 5, the jaw portion 1-1 is forced to moved under a counteracting force of the posts 11-2 (in an opposite direction of the arrow F in FIG. 1), and a moving direction at this moment is opposite to a loading direction of the toner container 10. The other end of the transverse linkage 1 is connected to a longitudinal linkage 2, and the other end of the longitudinal linkage 2 is connected to a cover body, so the longitudinal linkage 2 is rotatable with respect to the transverse linkage 1, and the other end of the longitudinal linkage 2 is also rotatable. The longitudinal linkage 2 is rotated around the other end of the linkage. Referring to FIGS. 4-6, three different positions of the linkage device 3 are shown. FIG. 4 shows an initial position (the toner outlet 10-1 and the toner collecting port 11-1 are separated), FIG. 5 shows an interim position (the toner outlet 10-1 and the toner collecting port 11-1 are in docking), and FIG. 6 shows an ending position (the toner outlet 10-1 and the toner collecting port 11-1 are sealed). FIG. 7 shows a sectional view of FIG. 4, and FIG. 8 shows a sectional view of FIG. 5.

Figure 9:
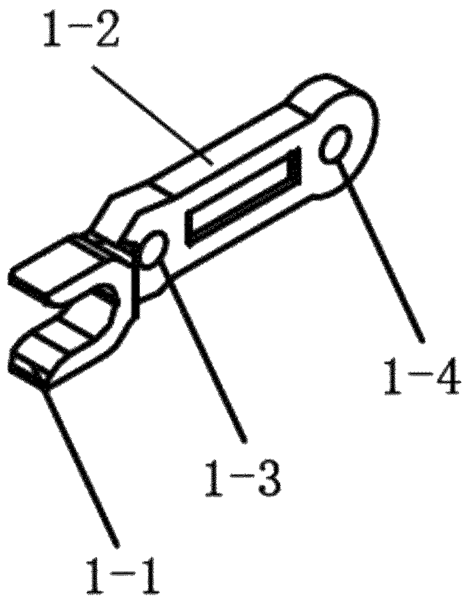
FIG. 9 is a perspective view of a transverse linkage according to embodiment 1.

The linkage device 3 are further illustrated as follows. The linkage device 3 comprises: a transverse linkage 1 as shown in FIG. 9, which comprises a rod body 1-2 and a jaw portion 1-1, wherein the jaw portion 1-1 is connected to a front end (in a direction of arrow F of FIG. 1) of the rod body 1-2. The jaw portion 1-1 is used to accommodate the posts 11-2 of the toner collecting device 11, so that when the toner container 10 is loaded into the toner collecting device 11, the posts 11-2 pushes the jaw portion 1-1 opposite to a moving direction of the toner container 10. According to embodiment 1, the rod body 1-2 has a first transverse linkage aperture 1-3 for connecting a longitudinal linkage. In embodiment 2, the rod body 1-2 has a first transverse linkage aperture position 1-3 and a second transverse linkage aperture position 1-4 at each end for connecting two longitudinal linkages, respectively. Preferably, the rod body 1-2 is drilled to prevent shrinkage and deformation (for example, the linkage device 3 is made of plastic).

Figure 10:
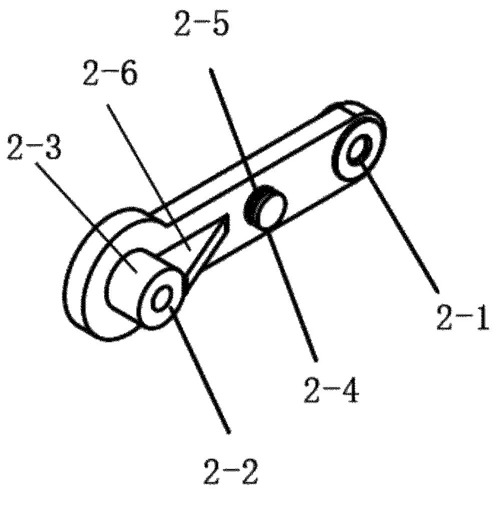
FIG. 10 is a perspective view of a longitudinal linkage according to the embodiment 1.
Figure 11:
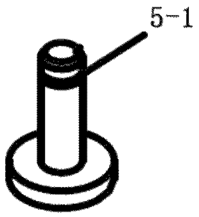
FIG. 11 is a perspective view of a piercing peg.
Figure 12:
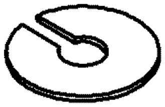
FIG. 12 is a perspective view of a circlip.
Figure 13:
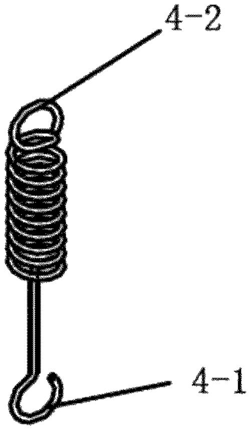
FIG. 13 is a perspective view of a tension spring.

The linkage device 3 further comprises: a longitudinal linkage 2 as shown in FIG. 10, wherein a second end of the longitudinal linkage 2 has a second longitudinal linkage aperture 2-2 and a first end of the longitudinal linkage 2 has a first longitudinal linkage aperture 2-1. A spring post 2-4 is provided in a middle of the longitudinal linkage 2, which has a slot 2-5. The first transverse linkage aperture 1-3 is coaxially coupled with the first longitudinal linkage aperture 2-1. In the embodiment 1, the two are combined by means of a piercing peg 5 shown in FIG. 11 and a circlip 6 shown in FIG. 12. Specifically, the piercing peg 5 passes through the first transverse linkage aperture 1-3 and the first longitudinal linkage aperture 2-1, and a slot position 5-1 of piercing peg 5 is fixed by the circlip 6 for mounting. The second longitudinal linkage aperture 2-2 is connected to a first connecting post 7-1 of the cover body 7 (see FIG. 14). A tension spring 4 is connected to the spring post 2-4 of the longitudinal linkage 2. A structure of the tension spring 4 is shown in FIG. 13, and one end of the tension spring 4 has a first hook 4-1 and the other has a second hook 4-2. The first hook 4-1 is connected to the slot 2-5 of the spring post 2-4, and the second hook is connected to the third connecting post 7-3 of the cover body 7 (see FIG. 14). Preferably, the longitudinal linkage 2 has a thicker end where the second hole position 2-2 is located, forming a boss 2-3. A reinforcement 2-6 extends aside the boss 2-3. When the linkage device 3 is made of plastic, the reinforcement 2-6 can provide protection against deformation.

Figure 14:
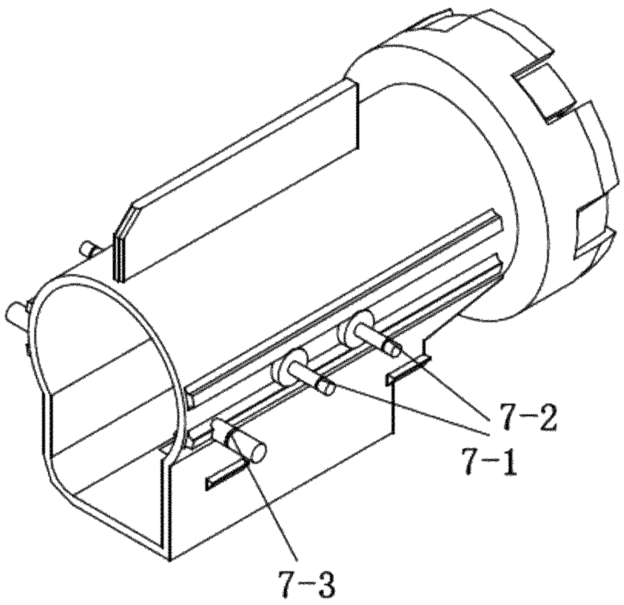
FIG. 14 is a perspective view of a cover body.

Referring to FIG. 14, the first connecting post 7-1 and the third connecting post 7-3 are arranged on a side face of the cover body 7. Preferably, a second connecting post 7-2 is further arranged on the side face of the cover body 7. The second connecting post 7-2 is flush with the first connecting post 7-1, and the third connecting post 7-3 is slightly lower than the other two connecting posts. The third connection post 7-3 is located on the front side of the first connection post 7-1. The first connecting post 7-1, the second connecting post 7-2 and the third connecting post 7-3 all have slots in them to cooperate with the circlip shown in FIG. 12, in such a manner that the longitudinal linkage can rotate around the first connecting post 7-1 and the second connecting post 7-2. The second hook 4-2 of the tension spring 4 can be hung in the slots of the third connecting post 7-3.

Figure 15:
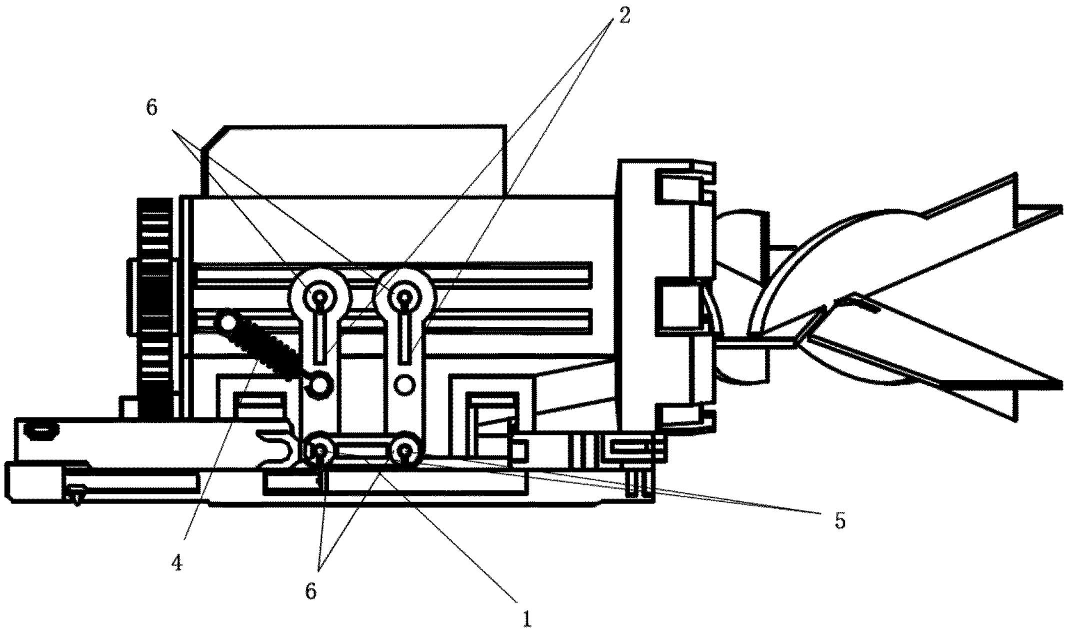
FIG. 15 is a perspective view of a mounting and conveying device according to the embodiment 1.

Referring to FIG. 15, preferably, the linkage device 3 comprises one transverse linkage 1 and two longitudinal linkages 2, wherein the transverse linkage 1 has the structure as shown in FIG. 9. The transverse linkage 1 has two apertures so that two longitudinal linkages can be connected. The first longitudinal linkage is linked in the same manner as previously described. A second aperture position 2-2 of the second longitudinal linkage is linked to the second connecting post 7-2 of the cover body 7 (see FIG. 14). With two longitudinal linkages, the toner collecting device 11 will not move in a horizontal direction related to the transverse linkage 1, namely a direction of the jaw portion 1-1 will not change.

Figure 16:
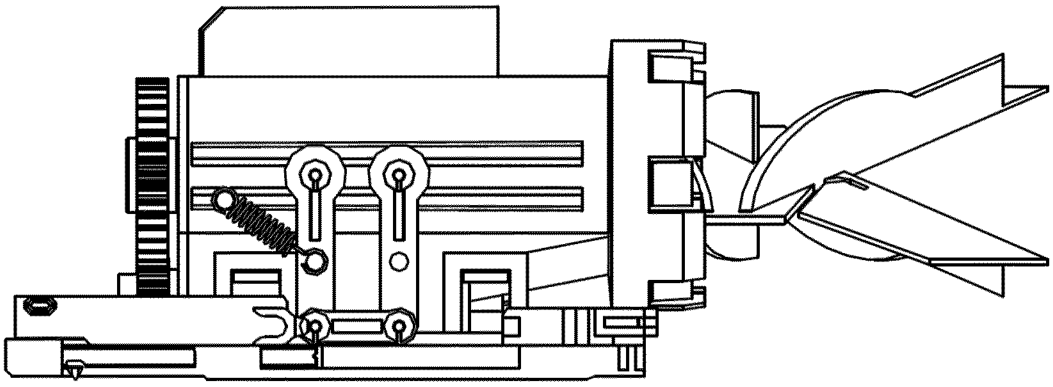
FIG. 16 is a side view of the toner container and the toner collecting device at the beginning of the installation.
Figure 17:
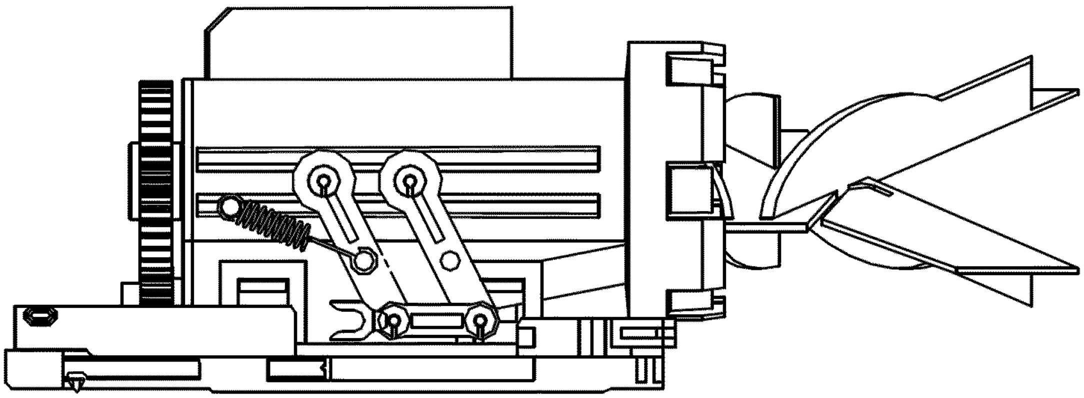
FIG. 17 is a side view of the toner container and the toner collecting device during the installation.
Figure 18:
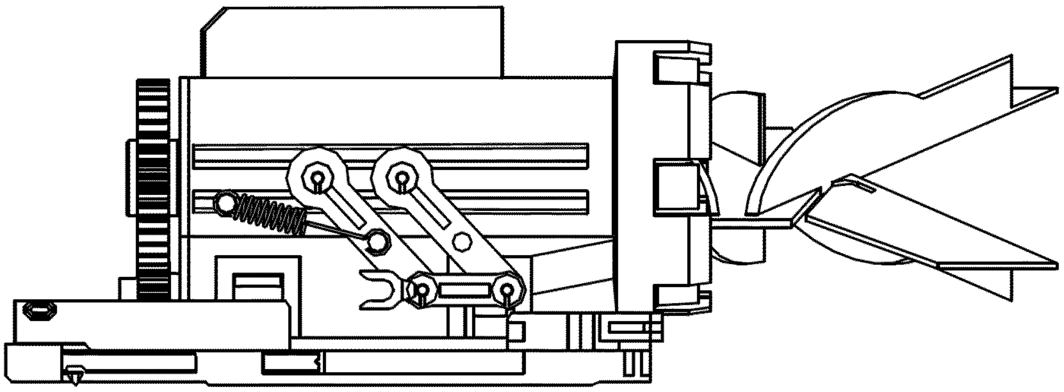
FIG. 18 is a side view of the toner container and the toner collecting device after the installation.

FIGS. 16-18 show movement of the linkage device, wherein FIG. 16 shows an initial position, FIG. 17 shows a lifting process, and FIG. 18 shows an end position of lifting. Because of aperture sliding fit between the transverse linkage 1 and the longitudinal linkage 2 by means of the piercing peg 5, the two can be rotated relative to each other. The first connecting post 7-1 and the second connecting post 7-2 on the cover body 7 have aperture sliding fits with the two longitudinal linkages, and can be rotated. Therefore, when the toner container 10 is loaded into the toner collecting device 11 and the jaw portion 1-1 of the transverse linkage 1 is subjected to the counteracting force of the toner collecting device 11, the transverse linkage 1 is pushed and drives the longitudinal linkage 2 to rotate around the first connecting post 7-1 and the second connecting post 7-2, wherein the tension spring 4 is stretched, and a position of the transverse linkage 1 is raised during rotation, leading to raising of the toner collecting device 11. As a result, the toner collecting port 11-1 of the toner collecting device 11 is docked with the toner outlet 10-1 of the toner container 10, so that a pathway is formed therebetween for effective toner supply.

When the toner container 10 is removed, movement of each part is reversed from that of the loading process. The amount of stretching of the tension spring 4 becomes smaller, and it eventually returns from a position shown in FIG. 18 to the initial position shown in FIG. 16.

Figure 19:
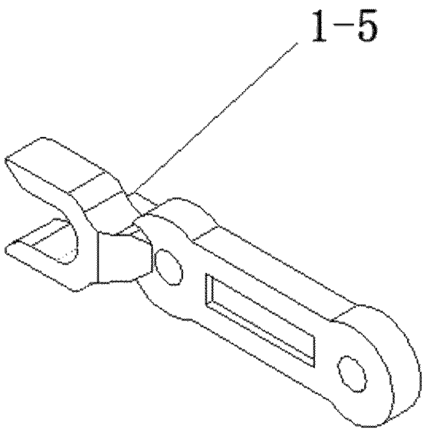
FIG. 19 is a perspective view of the transverse linkage according to embodiment 2.
Figure 20:
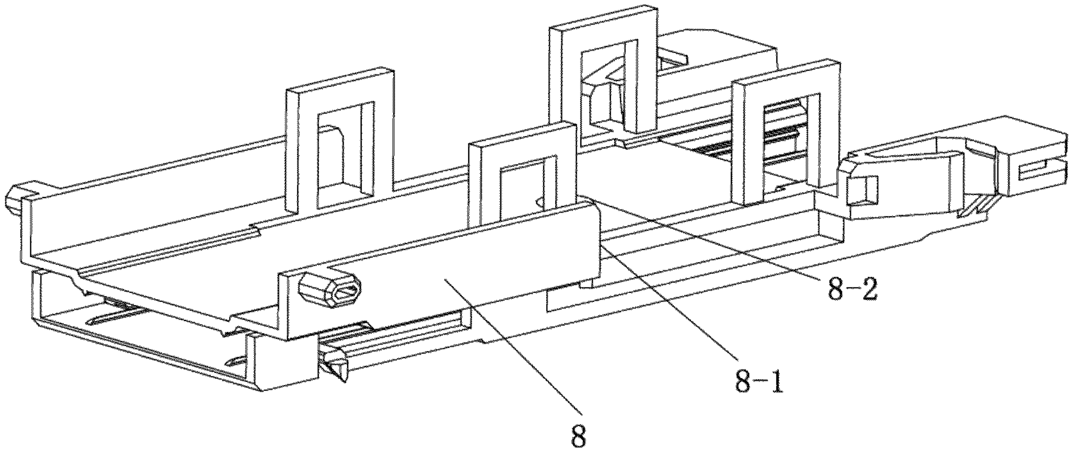
FIG. 20 is a perspective view of a base.
Figure 21:
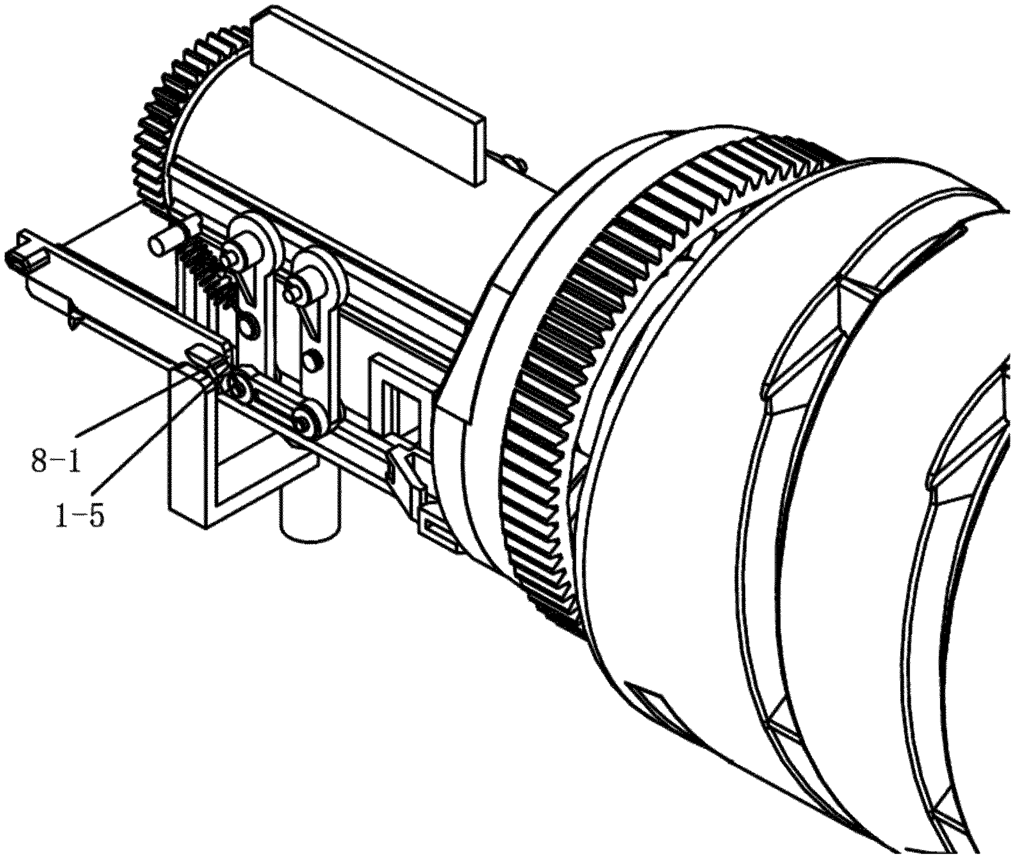
FIG. 21 a partially enlarged view of the mounting and conveying device.

Referring to FIGS. 19-21, preferably, a prop portion is arranged at an internal side of the jaw portion 1-1 of the transverse linkage 1. The prop position 1-5 prevents exceeding the initial position. The initial position shown in FIG. 16 is the lowest position of the transverse linkage 1. On the basis of a pulling force of the tension spring 4, the prop position 1-5 of the transverse linkage 1 presses against a base holder 8-1 of the base 8 (see FIG. 21) of the toner container 10, preventing the transverse linkage 1 from moving beyond the initial position under the pulling force of the tension spring 4. The base 8 has a base toner outlet 8-2. At the end position, the toner outlet 10-1 of the toner container 10, the toner collecting port 11-1 of the toner collecting device 11, and the base toner outlet 8-2 of the base 8 are separated (the toner container is removed, and the powder collecting port is separated from the toner outlet).

Figure 22:
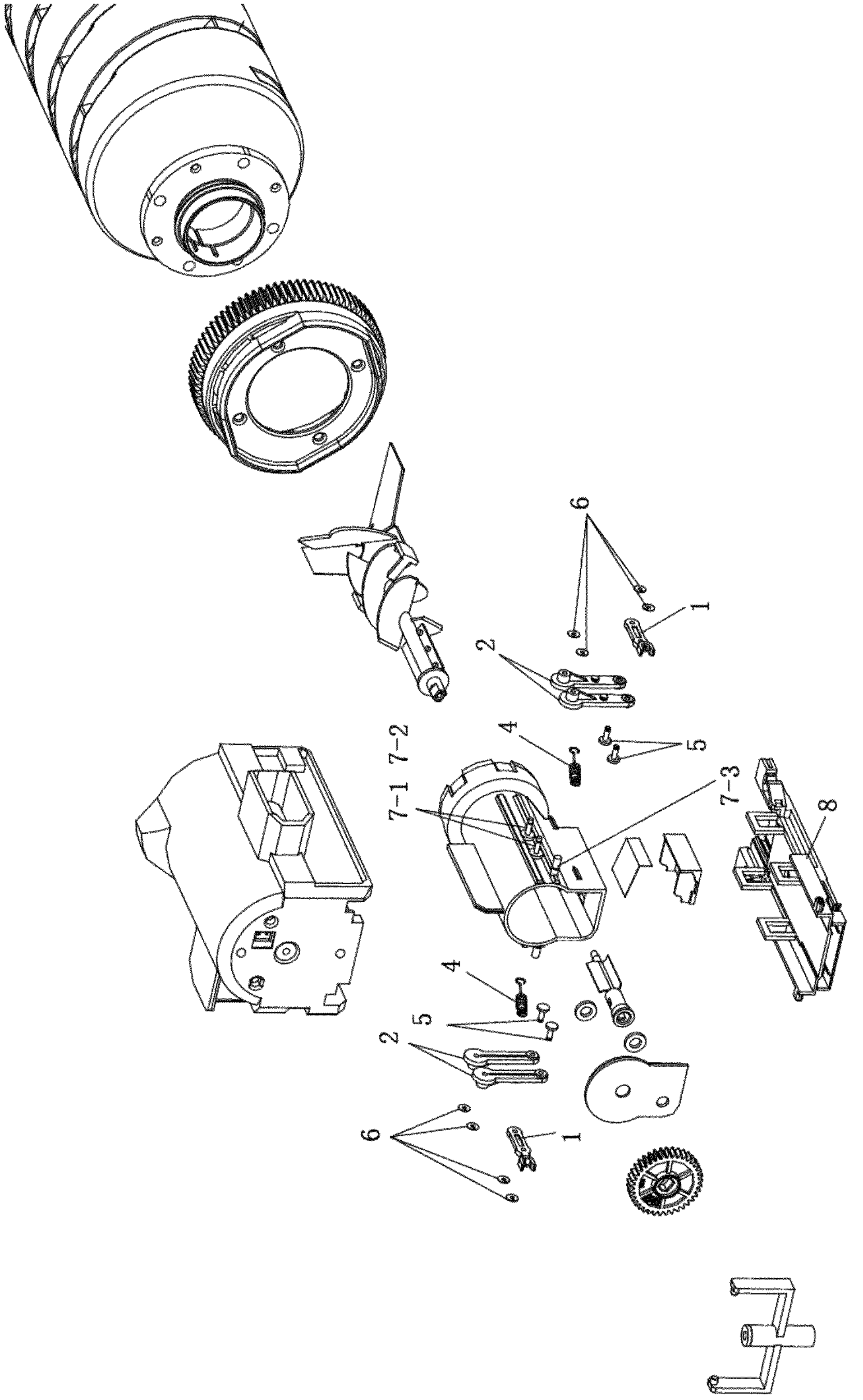
FIG. 22 is an exploded view of the mounting and conveying device according to the embodiment 1.

Referring to FIG. 22, two linkage devices 3, one on each side of the toner container 10, are required for cooperation with the toner container 10. The two linkage devices are symmetrically structured, and the linkage device described above is located on a left side of the toner container 10.

The above-described embodiments are only preferred ones of the present invention. The specification may cite phrases “in one embodiment”, “in another embodiment”, “in yet another embodiment” or “in other embodiments”, which may all refer to one or more of the same or different embodiments according to the present invention. Common changes and substitutions made by a person skilled in the art within the scope of the described technical scheme shall be included in the protection scope of the present invention.

What is claimed is:

1. A linkage device for a toner supply container, comprising:

a transverse linkage (1), which comprises a rod body (1-2) and a jaw portion (1-1), wherein the jaw portion (1-1) is connected to a front end of the rod body (1-2); and a longitudinal linkage (2), wherein a first end of the longitudinal linkage (2) is rotatably coupled to the rod body (1-2) of the transverse linkage (1);

wherein a first end of the rod body (1-2) of the transverse linkage (1) has a first transverse linkage aperture (1-3), and the first end of the longitudinal linkage (2) has a first longitudinal linkage aperture (2-1); the first transverse linkage aperture (1-3) is coaxially coupled with the first longitudinal linkage aperture (2-1);

wherein a second end of the rod body (1-2) of the transverse linkage (1) has a second transverse linkage aperture (1-4) for connecting an additional longitudinal linkage, a first end of the additional longitudinal linkage is coaxially coupled with the second transverse linkage aperture (1-4) of the transverse linkage (1).

2. A mounting and conveying device for a toner supply container, comprising:

a linkage device comprising: a transverse linkage (1), which comprises a rod body (1-2) and a jaw portion (1-1), wherein the jaw portion (1-1) is connected to a front end of the rod body (1-2); and a longitudinal linkage (2), wherein a first end of the longitudinal linkage (2) is rotatably coupled to the rod body (1-2) of the transverse linkage (1); and a cover body (7), wherein a first connecting post (7-1) and a third connecting post (7-3) are arranged on a side face of the cover body (7);

wherein a second end of the longitudinal linkage (2) is rotatably fixed to the first connecting post (7-1), and a spring post (2-4) is connected to the third connecting post (7-3) by a tension spring.

3. The mounting and conveying device, as recited in claim 2, wherein a first end of the rod body (1-2) of the transverse linkage (1) has a first transverse linkage aperture (1-3), and the first end of the longitudinal linkage (2) has a first longitudinal linkage aperture (2-1); the first transverse linkage aperture (1-3) is coaxially coupled with the first longitudinal linkage aperture (2-1).

4. The mounting and conveying device, as recited in claim 2, wherein a prop portion (1-5) is arranged on a side face of the jaw portion (1-1) of the transverse linkage (1).

5. The mounting and conveying device, as recited in claim 4, further comprising:

a base (8), wherein the base (8) has a base holder (8-1); the prop portion (1-5) is pulled by the tension spring, so as to cooperate with the base holder (8-1) and back to an initial position.

6. The mounting and conveying device, as recited in claim 3, wherein a second connecting post (7-2) is further arranged on the side face of the cover body (7).

7. The mounting and conveying device, as recited in claim 6, wherein the linkage device further comprises an additional longitudinal linkage; a second end of the rod body (1-2) of the transverse linkage (1) has a second transverse linkage aperture (1-4); a first end of the additional longitudinal linkage is coaxially coupled with the second transverse linkage aperture (1-4) of the transverse linkage (1); a second end of the additional longitudinal linkage is coaxially coupled with the second connecting post (7-2).

* * * * *